United States Patent [19]
Sato

[11] Patent Number: 5,956,320
[45] Date of Patent: Sep. 21, 1999

[54] CELL ASSEMBLING/DISASSEMBLING SYSTEM FOR ASYNCHRONOUS TRANSFER MODE NETWORK

[75] Inventor: Kazumi Sato, Kawasaki, Japan

[73] Assignee: Fujitsu Limited, Kanagawa, Japan

[21] Appl. No.: 09/081,907

[22] Filed: May 20, 1998

Related U.S. Application Data

[63] Continuation of application No. 08/210,156, Mar. 17, 1994, abandoned.

[30] Foreign Application Priority Data

Sep. 8, 1993 [JP] Japan .................................. 5-223222

[51] Int. Cl.⁶ .................................................. H04L 12/56
[52] U.S. Cl. .......................... 370/229; 370/395; 370/474
[58] Field of Search ..................................... 370/229, 230, 370/235, 395, 232, 465, 473, 474, 468; 340/825.5, 825.51

[56] References Cited

U.S. PATENT DOCUMENTS

| | | | |
|---|---|---|---|
| 5,130,985 | 7/1992 | Kondo et al. ............................ | 370/465 |
| 5,136,584 | 8/1992 | Hedlund .................................. | 370/474 |
| 5,204,882 | 4/1993 | Chao et al. .............................. | 370/395 |
| 5,249,185 | 9/1993 | Knanno et al. .......................... | 370/465 |
| 5,267,232 | 11/1993 | Katsube et al. ......................... | 370/395 |
| 5,282,203 | 1/1994 | Oouchi .................................... | 370/235 |
| 5,315,591 | 5/1994 | Brent et al. ............................. | 370/235 |

*Primary Examiner*—Chau Nguyen
*Attorney, Agent, or Firm*—Helfgott & Karas, P.C.

[57] ABSTRACT

A cell assembling/disassembling system used for an ATM network system having a priority order cell discarding system which device can be operated with a reduced time delay associated with assembling/disassembling of a cell when a cell priority order control is applied. The cell assembling/disassembling system is provided with a first unit which sets a cell assembling device, when an amount of data currently being transmitted is more than a predetermined amount, to a first assembling mode where each of cells assembled by the cell assembling device has a discarding priority order. A second unit sets a cell disassembling device, when the cell assembling device performs a cell assembling operation using the first assembling mode, to a first disassembling mode where cells having the discarding priority order are disassembled. A third unit sets the cell assembling device, when the amount of data currently being transmitted through the ATM network is less than the predetermined amount, to a second assembling mode where a regular cell assembling operation by which no discarding priority order is provided to cells is performed. A fourth unit sets the cell disassembling device, when the cell assembling device performs a cell assembling operation using the second assembling mode, to a second disassembling mode where cells having no discarding priority order are disassembled.

18 Claims, 21 Drawing Sheets

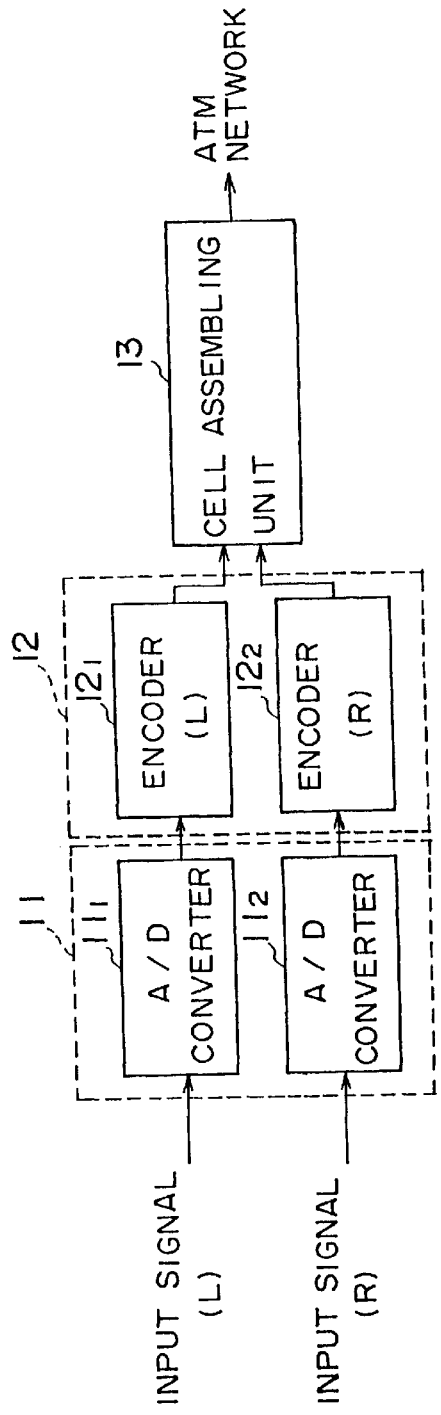
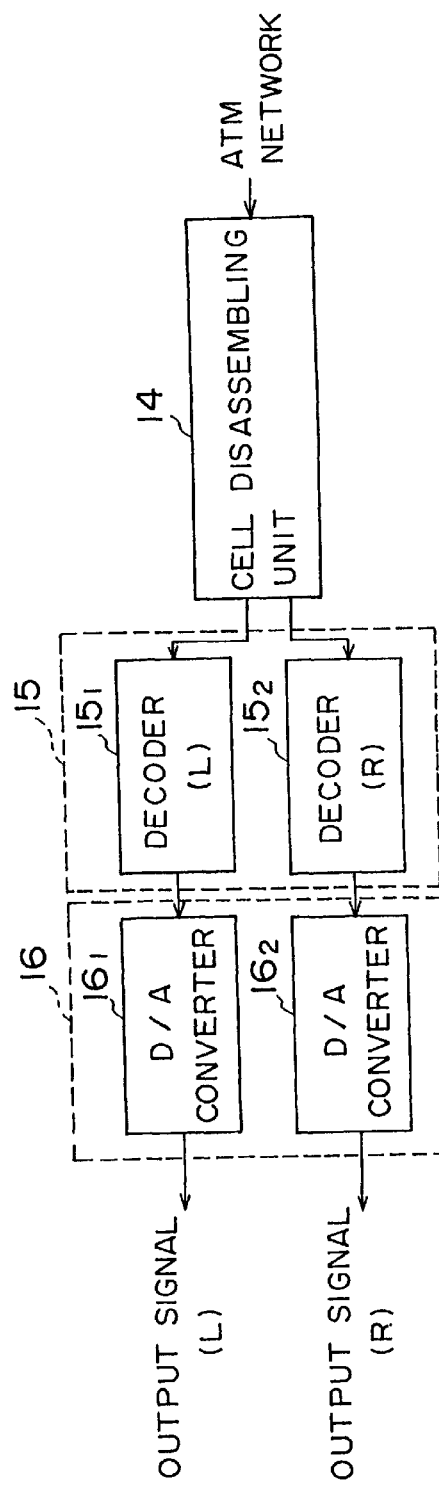
FIG. 1A PRIOR ART
FIG. 1B PRIOR ART

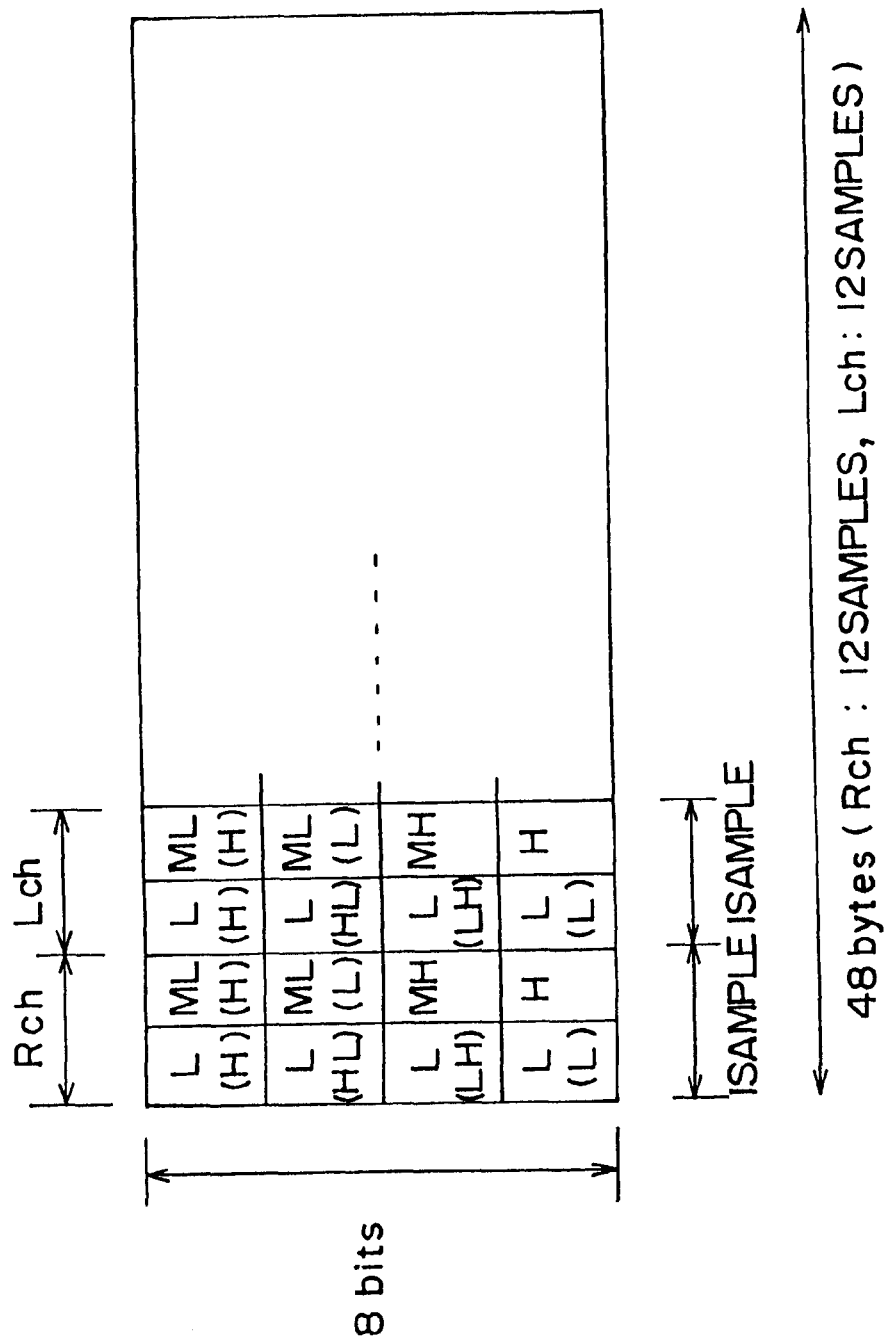

48bytes(Rch:96SAMPLES, Lch: 96 SAMPLES)

48byte(Rch:96SAMPLES, Lch:96SAMPLES)

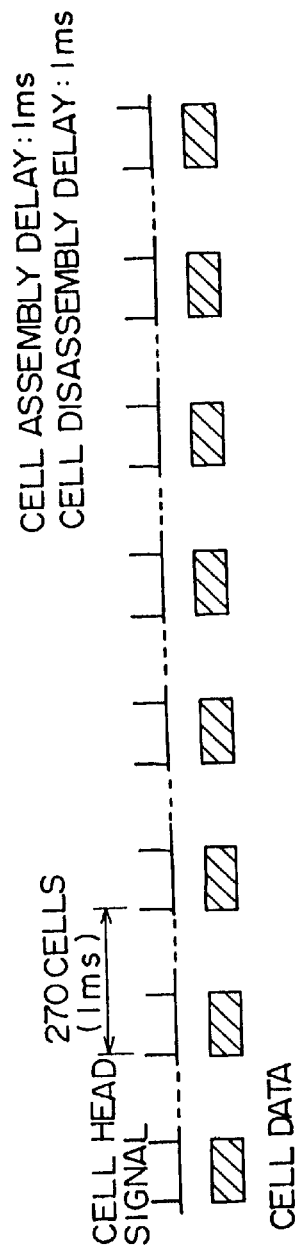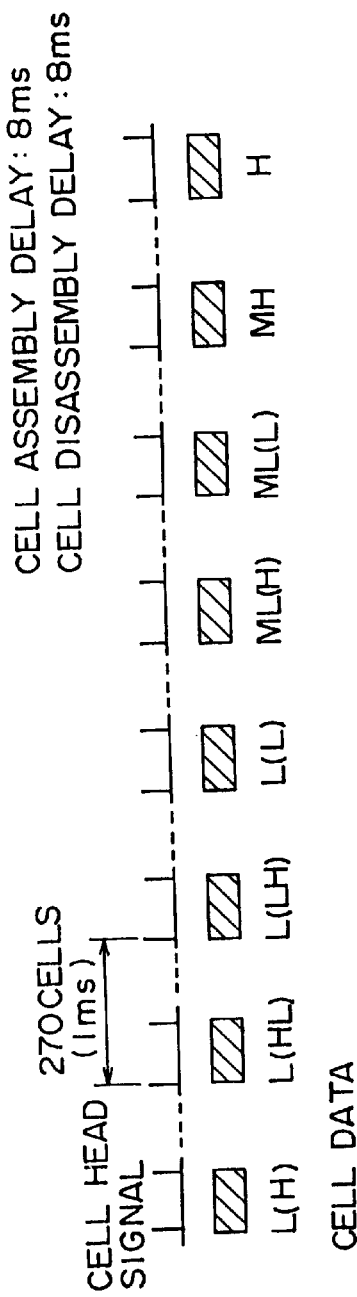

CELL ASSEMBLING/DISASSEMBLING SYSTEM FOR ASYNCHRONOUS TRANSFER MODE NETWORK

This is a continuation of Ser. No. 08/210,156, filed Mar. 17, 1994 abandoned.

BACKGROUND OF THE INVENTION

1. Field of the Invention

The present invention relates to a cell assembling/disassembling system used for an asynchronous transfer mode network in which high transmission rate communication is performed, and more particularly to a cell assembling/disassembling device and method used with a cell controlling system having a cell priority discarding function.

2. Description of the Prior Art

In recent years, an asynchronous transfer mode (ATM) communication system has attracted considerable attention since the feasibility of its realization has increased. The ATM communication system can be applied to various data transmission systems having various transmission rates, such as image data communication systems, high transmission rate file communication systems and audio data communication systems.

In the ATM network, there is a case where a cell priority discarding control function is required. In the system having a cell priority discard control function, it is necessary to reduce the time delay associated with assembling/disassembling of cells.

In order to realize the ATM system, various end terminals provided to the ATM network, such as audio signal encoding devices, are needed.

FIG. 1A shows a block diagram of an audio signal encoding device adapted to be used for the ATM network, and FIG. 1B shows a block diagram of an audio signal decoding device adapted to be used for the ATM network. The audio signal encoding device encodes audio signals, L and R, of a two-channel stereo system, and assembles a cell to send to the ATM network. The audio signal decoding device disassembles the cell received from the ATM network, and decodes to reproduce the original audio signals.

In the encoding device shown in FIG. 1A, an analog/digital (A/D) converting unit 11 comprises two A/D converters $11_1$ and $11_2$ which convert an input analog signal to a digital signal. The A/D converter $11_1$ is provided for converting an input signal of a left channel (L), and the A/D converter $11_2$ is provided for converting an input signal of a right channel (R).

An encoding unit 12 comprises two encoders $12_1$ and $12_2$ which compress and encode an input digital audio signal. The encoder $12_1$ is provided for the left channel input signal and the encoder $12_2$ is for the right channel input signal. A cell assembling unit 13 combines the left and right encoded signals and assembles a cell so as to send cell data to the ATM network.

In the decoding device shown in FIG. 1B, a cell disassembling unit 14 extracts a cell addressed to it from cells transmitted through the ATM network, and disassembles the cell so as to obtain left and right encoded signals. A decoding unit 15 comprises two decoders $15_1$ and $15_2$ which decompress and decode the encoded signals supplied by the cell disassembling unit 14. The decoder $15_1$ is provided for the left channel (L) and the decoder $15_2$ is for the right channel (R).

A digital/analog (D/A) converting unit 16 comprises two D/A converters $16_1$ and $16_2$ which convert the digital audio signals supplied by the decoders $16_1$ and $16_2$ to analog signals, respectively. The A/D converter $16_1$ is provided for converting the digital audio signal supplied by the decoder $15_1$ into an output signal of the left channel (L), and the A/D converter $16_2$ is provided for an output signal of the right channel (R).

FIG. 2 shows a relationship between a cell head signal and a cell structure used for the ATM network. Hereupon, the length of a cell is 53 bytes including 5 bytes for a header area and 48 bytes for the data area. The cell is handled as 8-bit parallel data. The data clock signal is 19.44 MHz, and the cell head signal is 270 kHz.

FIG. 3 shows an example of a structure of the encoders shown in FIG. 1. Three frequency band dividing filters $18_1$, $18_2$, $18_3$ are used in the example of the encoder. The filter $18_1$ divides an audio signal having 24 KHz bandwidth to two signals each having 12 KHz bandwidth. Each of the filters $18_2$ and $18_3$ divides the signal supplied by the filter $18_1$ having 12 KHz bandwidth into two signals each having 6 KHz bandwidth. A quadrature mirror filter, for example, may be used for the filters $18_1$, $18_2$, $18_3$.

Adaptive differential pulse code modulation (ADPCM) encoders $19_1$, $19_2$, $19_3$, $19_4$ encode the respective audio signals having frequency bands 0–6 KHz, 6–12 KHz, 12–18 KHz, 18–24 KHz, supplied by the filters $18_1$ and $18_2$.

A quantization code signal output from the ADPCM encoder $19_1$ comprises 8 bits and is designated as "L". A quantization code signal output from the ADPCM encoder $19_2$ comprises 4 bits and is designated as "ML". A quantization code signal output from the ADPCM encoder $19_3$ comprises 2 bits and is designated as "MH". A quantization code signal output from the ADPCM encoder $19_4$ comprises 2 bits and is designated as "H". Additionally, an embedded ADPCM method is applied to the frequency bands 0–6 KHz and 6–12 KHz with the number of core bits set to 4 and 2, respectively.

FIG. 4 shows the structure of a quantization code signal when a cell priority order is considered. That is, the 8-bit quantization code corresponding to the frequency band 0–6 KHz is divided into four 2-bit codes, and the 2-bit codes are designated, in turn from the most significant bit, as "L(H)", "L(HL)", "L(LH)" and "L(L)", respectively. The bits of "L(LH)" and "L(L)" are used for embedding. The 4-bit quantization code corresponding to the frequency band 6–12 KHz is divided into two 2-bit codes, and the 2-bit codes are designated, in turn from the most significant bit, as "ML(H)" and "ML(L)", respectively. The bits of "ML(L)" are used for embedding. As mentioned above, the frequency band 12–18 KHz is designated as "MH", and 18–24 KHz is designated as "H".

FIG. 5 shows the relationship between the output timing of the quantization code and the cell head signal. When the sampling frequency of the audio signal is 48 KHz, the sampling frequency becomes 12 KHz at the ADPCM encoders because the sampling frequency is also divided by the frequency band dividing filters $18_1$, $18_2$, $18_3$. Accordingly, quantization codes comprising 8 bits, 4 bits, 2 bits and 2 bits, are sequentially supplied to the corresponding ADPCM encoders $19_1$, $19_2$, $19_3$, $19_4$ each having 12 kHz sampling frequency.

A time delay, when performing a cell assembling operation in accordance with the above-mentioned quantization codes, occurs as described below. First, in the case where cell priority order control is not applied, one set of quantization codes (16 bits in total) is produced for each period corresponding to 22.5 cells, because the cell head signal is 270 KHz and the output timing of the quantization codes is 12 KHz. Since data of a single cell have 48 bytes (384 bits), 24 times (384÷16=24) outputs are needed to buffer data destined for a single cell. Accordingly, the time delay in this case is 2.0 ms (24÷12 KHz=2.0 ms) which corresponds to 540 cell period. If a stereo system is used, the time delay is 1.0 ms (270 cell period).

FIG. 6 shows the structure of a cell in a condition where cell priority order control is not performed. Single samples for the left channel (Lch) and the right channel (Rch) are alternatively output. 12 samples are output for each channel, and accordingly the single cell having 48 bytes and including 24 samples is produced. Each sample comprises "L(H)", "L(HL)", "L(LH)", "L(L)", "ML(H)", "ML(L)", "MH" and "H", and those quantization codes are output in that order.

When cell priority order control is applied, cells are assembled to contain quantization codes of a single type, and certain cells are discarded in accordance with a cell priority associated with the type of code contained in the cell. Quality of encoded audio signals is dependent on the number of cells discarded.

FIG. 7A is a graph showing the relationship between signal to noise ratio (SNR) and cell discard ratio, and FIG. 7B shows the discarding order of cells when cell priority order is applied.

In FIG. 7A, the solid line represents the sound of a flute; the dotted line represents a violin, the dashed line represents a pipe organ and the chain line represents a brass instrument. The vertical line at a cell discard ratio of 12.5% corresponds to a case where a cell corresponding to the quantization code "H" is discarded. The vertical line at a cell discard ratio of 25.0% corresponds to a case where cells corresponding to the quantization codes "H" and "MH" are discarded. The vertical line at a cell discard ratio of 37.5% corresponds to a case where cells corresponding to the quantization codes "H", "MH" and "ML(L)" are discarded. The vertical line at a cell discard ratio of 50.0% corresponds to a case where cells corresponding to the quantization codes "H", "MH", "ML(L)" and "L(L)" are discarded.

FIGS. 8A through 8H are illustrations for showing constructions of cell data assembled in accordance with the cell priority order. FIG. 8A shows a single cell comprising data corresponding to the quantization code "L(H)". FIG. 8B shows a single cell comprising data corresponding to the quantization code "L(HL)". FIG. 8c shows a single cell comprising data corresponding to the quantization code "L(LH)". FIG. 8D shows a single cell comprising data corresponding to the quantization code "L(L)". FIG. 8E shows a single cell comprising data corresponding to the quantization code "ML(H)". FIG. 8F shows a single cell comprising data corresponding to the quantization code "ML(L)". FIG. 8G shows a single cell comprising data corresponding to the quantization code "MH". FIG. 8H shows a single cell comprising data corresponding to the quantization code "H".

As shown in FIGS. 8A through 8H, 96 samples of the audio signals for each of the left and right channels are needed to be assembled into a single cell because the 8 cells shown in FIGS. 8A through 8H are needed to be assembled at the same time. Accordingly, cell assembling time in a case where the cell is assembled in accordance with the cell priority order is 8 times greater than that in a case where the cell priority order control is not applied.

FIGS. 9A and 9B show output timing of cell data output from a cell assembling device. FIG. 9A shows a case where the cell priority order control is not applied, and FIG. 9B shows a case where the cell priority order control is applied. As mentioned above, if one cell is transmitted in a time corresponding to 270 cell periods (1 ms) in the case where the cell priority order control is not applied, the time delay due to cell assembling is 1 ms, and accordingly the corresponding time delay to be required for disassembling the cell is also 1 ms. On the other hand, in the case where the cell priority order is applied, the time delay corresponding to the cell assembling time is 8 ms, and accordingly the time delay occurring due to disassembling of the cell is 8 ms. The total time delay in the above case is as great as 16 ms.

As mentioned above, when cell priority order control is applied to assemble a cell, the time delay occurring due to assembling and disassembling of the cell is increased as compared with a case where cell priority order control is not applied. Particularly in an audio signal transmission in which real-time operation is important, there is a need to minimize the time delay due to a cell assembling and disassembling operation.

SUMMARY OF THE PRESENT INVENTION

It is a general object of the present invention to provide an improved and useful cell assembling/disassembling system in which the above-mentioned disadvantages are eliminated.

A more specific object of the present invention is to provide a cell assembling/disassembling system used for an ATM network system which system can be operated with a reduced time delay associated with assembling/disassembling of a cell when cell priority order control is applied.

In order to achieve the above-mentioned objects, according to the present invention, there is provided a cell assembling/disassembling system used for an ATM network system having a cell priority discard control function, at least one cell assembling device and at least one cell disassembling device being provided in the ATM network system, all cells assembled by the cell assembling device being transferred to the cell disassembling device when an amount of data currently being transmitted through an ATM network is less than a predetermined amount, some cells being discarded when an amount of data currently being transmitted through the ATM network is more than the predetermined amount, the cell assembling/disassembling system comprising:

a first unit for setting the cell assembling device, when the amount of data currently being transmitted is more than the predetermined amount, to a first assembling mode where each of cells assembled by the cell assembling device has a discarding priority order;

a second unit for setting the cell disassembling device, when the cell assembling device performs a cell assembling operation using the first assembling mode, to a first disassembling mode where cells having the discarding priority order are disassembled;

a third unit for setting the cell assembling device, when the amount of data currently being transmitted through the ATM network is less than the predetermined amount, to a second assembling mode where a regular cell assembling operation in which no discarding priority order is provided to cells is performed; and a fourth unit for setting the cell disassembling device, when the cell assembling device performs a cell assembling operation using the second assembling mode, to a second disassembling mode where cells having no discarding priority order are disassembled.

There is provided a cell assembling/disassembling system used for an ATM network system having a cell priority discard control function, at least one cell assembling device and at least one cell disassembling device being provided in the ATM network system, all cells assembled by the cell assembling device being transferred to the cell disassembling device when an amount of data currently being transmitted through an ATM network is less than a predetermined amount, some cells being discarded when the amount of data currently being transmitted through the ATM network is more than the predetermined amount, the cell assembling/disassembling system comprising:

a first unit, provided in the cell assembling device, for assembling a cell having a first area and a second area, the first area being provided with first data assembled by a first assembling method so that the first area has a discarding priority order, the second area being provided with second data assembled by a second assembling method by which the second area has no discarding priority order;

a second unit, provided in the cell disassembling device, for receiving the cell from the ATM network and disassembling the cell; and a third unit for setting the second unit so that the second unit selects and outputs the first data disassembled by the second unit when the amount of data currently being transmitted through the ATM network is more than the predetermined amount, and so that the second unit selects and outputs the second data disassembled by the second unit when the amount of data currently being transmitted through the ATM network is less than the predetermined amount.

Other objects, features and advantages of the present invention will become more apparent from the following detailed description when read in accordance with the accompanying drawings.

BRIEF DESCRIPTION OF THE DRAWINGS

FIG. 1A is a block diagram of an audio signal encoding device adapted for the ATM network;

FIG. 1B is a block diagram of an audio signal decoding device adapted for the ATM network;

FIG. 6 is an illustration showing a structure of cell data when cell priority order control is not performed;

FIGS. 9A and 9B are illustrations showing output timing of cells output from a cell assembling device;

DETAILED DESCRIPTION OF THE PREFERRED EMBODIMENT

Figure 10A:
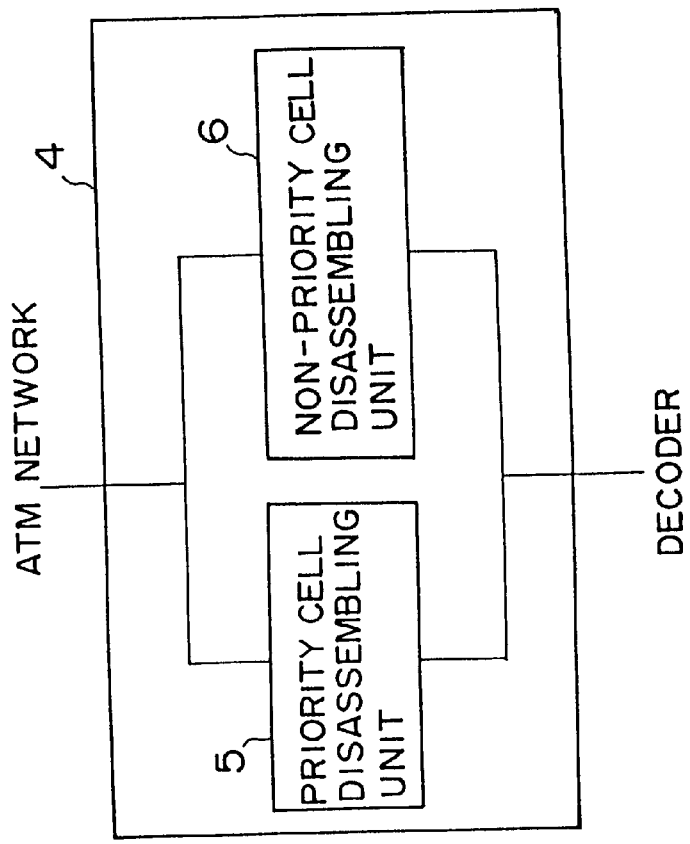
FIG. 10A is a block diagram showing a cell assembling device according to the present invention.
Figure 10B:
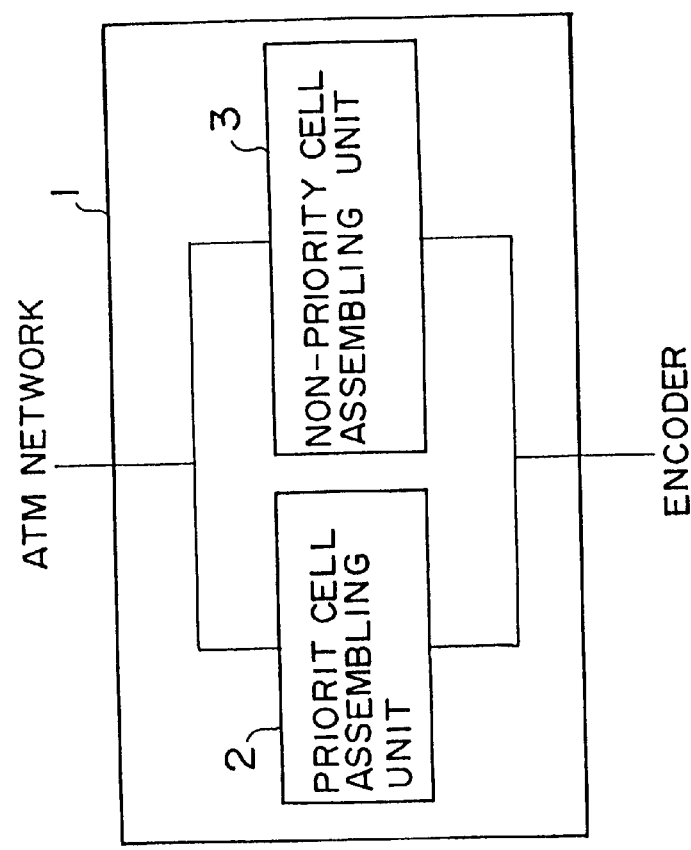
FIG. 10B is a block diagram showing a cell disassembling device according to the present invention.

A description will now be given, with reference to FIGS. 10A and 10B, of a principle of the present invention. FIG. 10A shows a cell assembling device, and FIG. 10B shows a cell disassembling device. The present invention is directed to a cell assembling/disassembling device used for an ATM network system in which cells are discarded in accordance with a predetermined order in response to the availability of a transmission path. According to the present invention, cells transmitted through an ATM network can be assembled/disassembled by one of two methods by switching to either method, one method using a cell priority order mode for discarding cells and the other method not using the cell priority order mode.

As shown in FIG. 10A, the cell assembling device 1 according to the present invention comprises a priority cell assembling unit 2 and a non-priority cell assembling unit 3. The priority cell assembling unit 2 assembles a cell by the method which uses a cell priority order mode, and the non-priority cell assembling unit 3 assembles a cell by the method which does not use the cell priority order mode.

When a transmission path of the ATM network is busy, which condition causes discarding of cells, code data are supplied by an encoder to the priority cell assembling unit 2. The code data are then assembled into a cell usincg the cell assembling method which uses a cell priority order mode by the priority cell assembling unit 2. When the transmission of the cells is performed, some cells may be discarded in accordance with a discarding order as described in the description of the prior art so that the amount of transmitted data is reduced. Cells which are not discarded and are transmitted through the ATM network are supplied to the priority cell disassembling unit 5 of the cell disassembling unit 4. The cells are disassembled to code data by the cell priority disassembling unit 5, and the code data are output to a decoder.

If the transmission path of the ATM network is not busy, which condition does not cause discarding of cells, code data are supplied from the encoder to the non-priority cell assembling unit 3. The code data are then assembled into a cell using the cell assembling method which does not use a cell priority order mode by the non-priority cell assembling unit, so that the time delay for assembling and disassembling of cells is minimized. Cells transmitted through the ATM network are supplied to the non-priority cell disassembling unit 6 of the cell disassembling unit 4. The cells are disassembled to code data by the non-priority cell disassembling unit 6, and the code data are output to the decoder.

Figure 11:
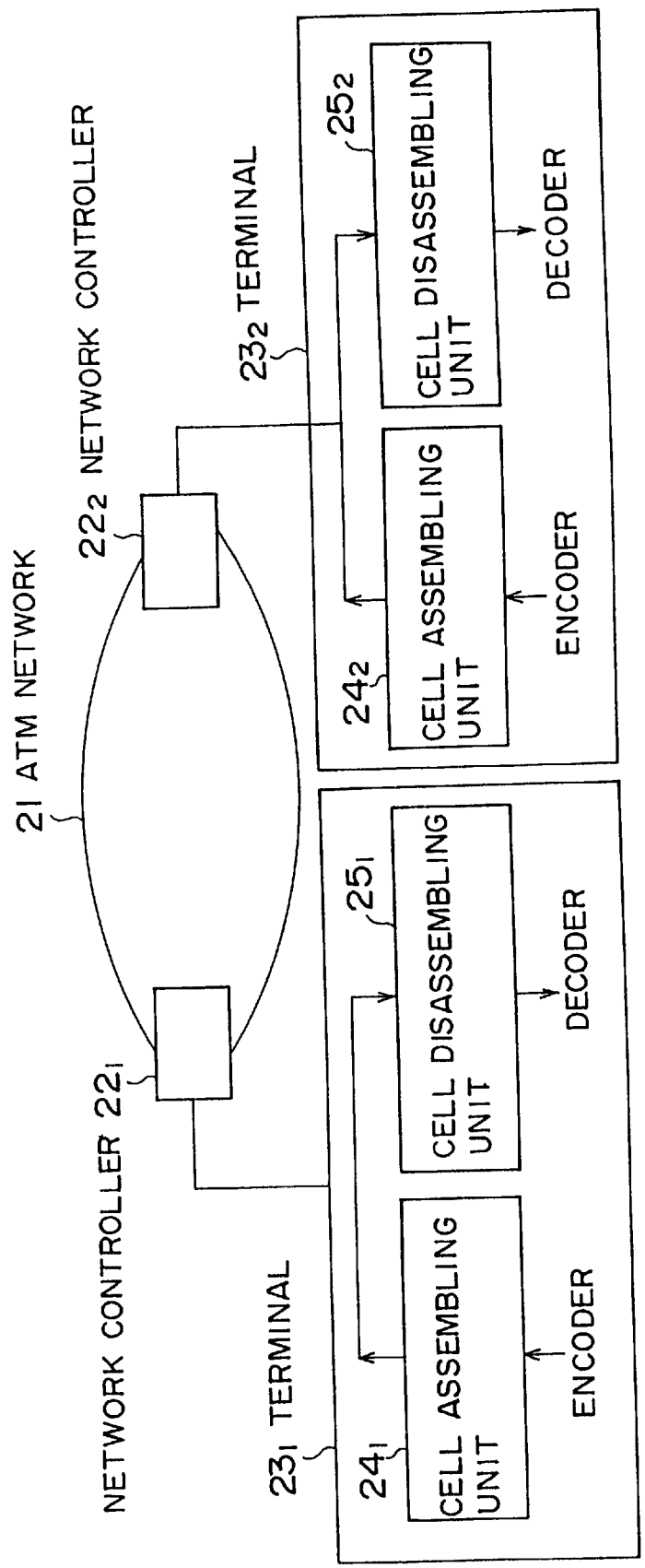
FIG. 11 is an illustration showing an ATM network system in which a first embodiment of a cell assembling/disassembling unit according to the present invention is used.

A description will now be given, with reference to FIG. 11, of a first embodiment of a cell assembling/disassembling system according to the present invention. FIG. 11 is an illustration showing an ATM network system in which a cell assembling/disassembling unit according to the first embodiment is used. In FIG. 11, a network controller $22_1$ and a network controller $22_2$ are connected via an ATM network 21. The network controller $22_1$ is connected to a terminal $23_1$. The network controller $22_2$ is connected to a terminal $23_2$. A cell assembling/disassembling device is provided to each terminal $23_1$, $23_2$.

Figure 2:
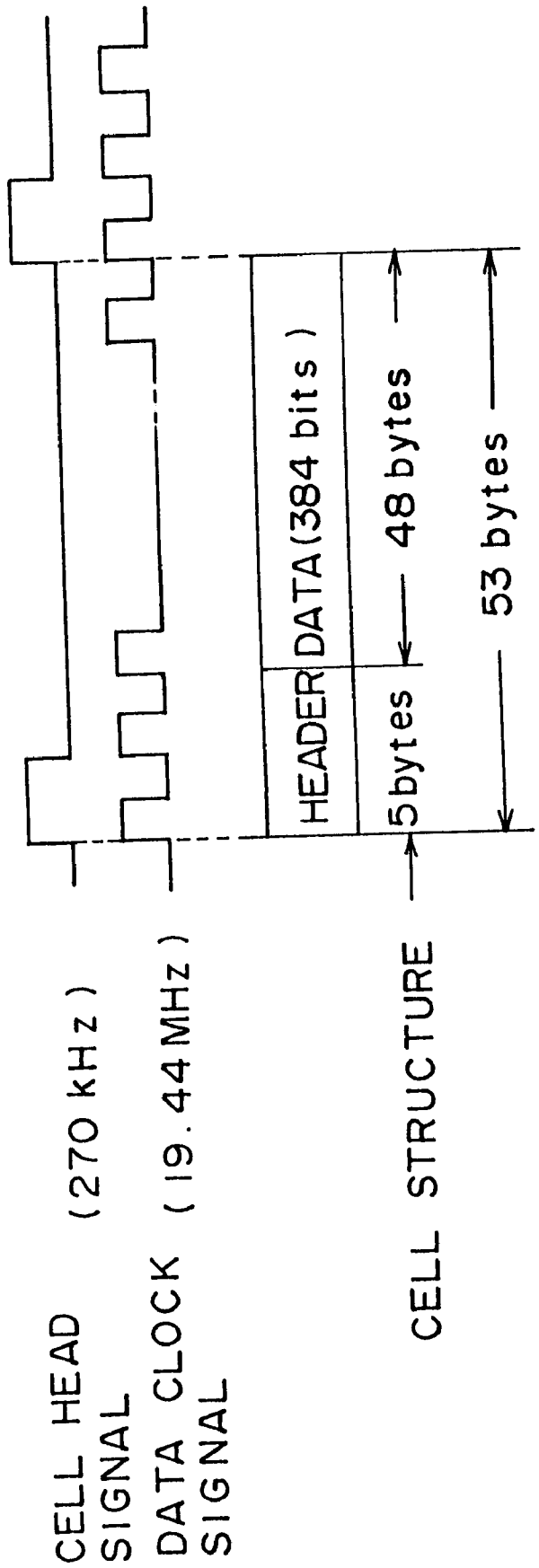
FIG. 2 is an illustration showing a relationship between a cell head signal and a cell structure used for the ATM network.
Figure 3:
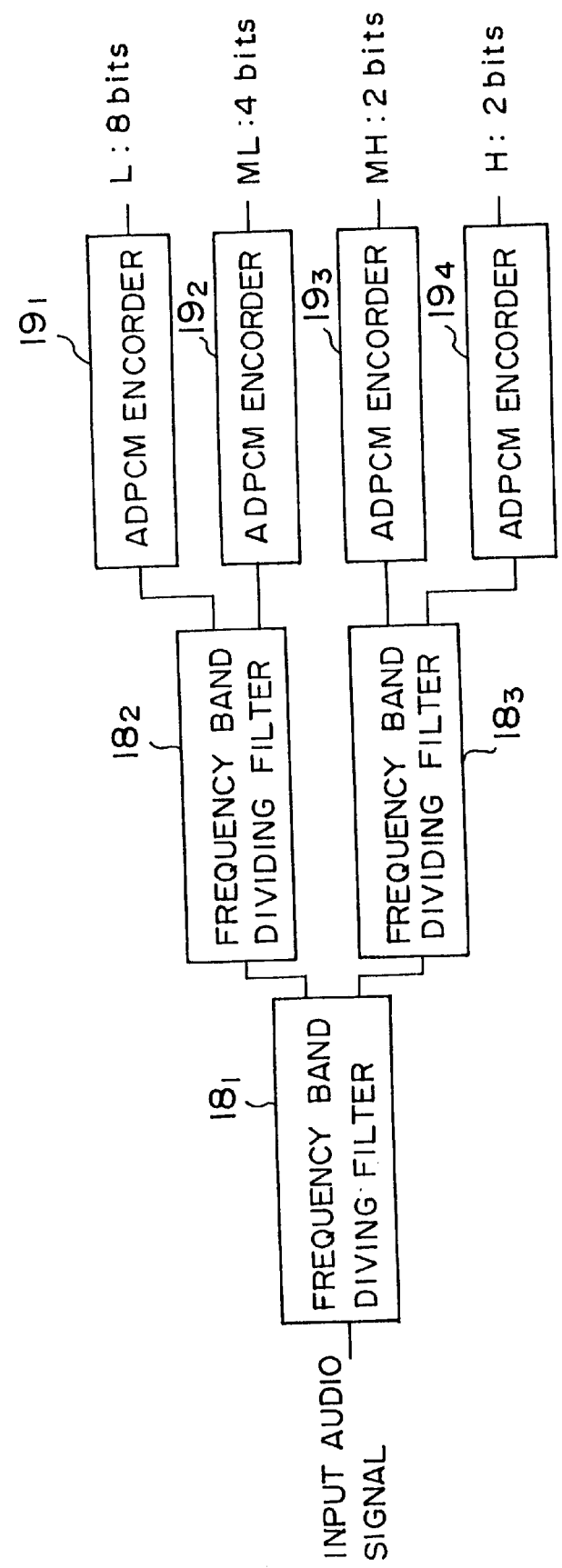
FIG. 3 is a block diagram of a structure of the encoder shown in FIG. 1.
Figure 4:
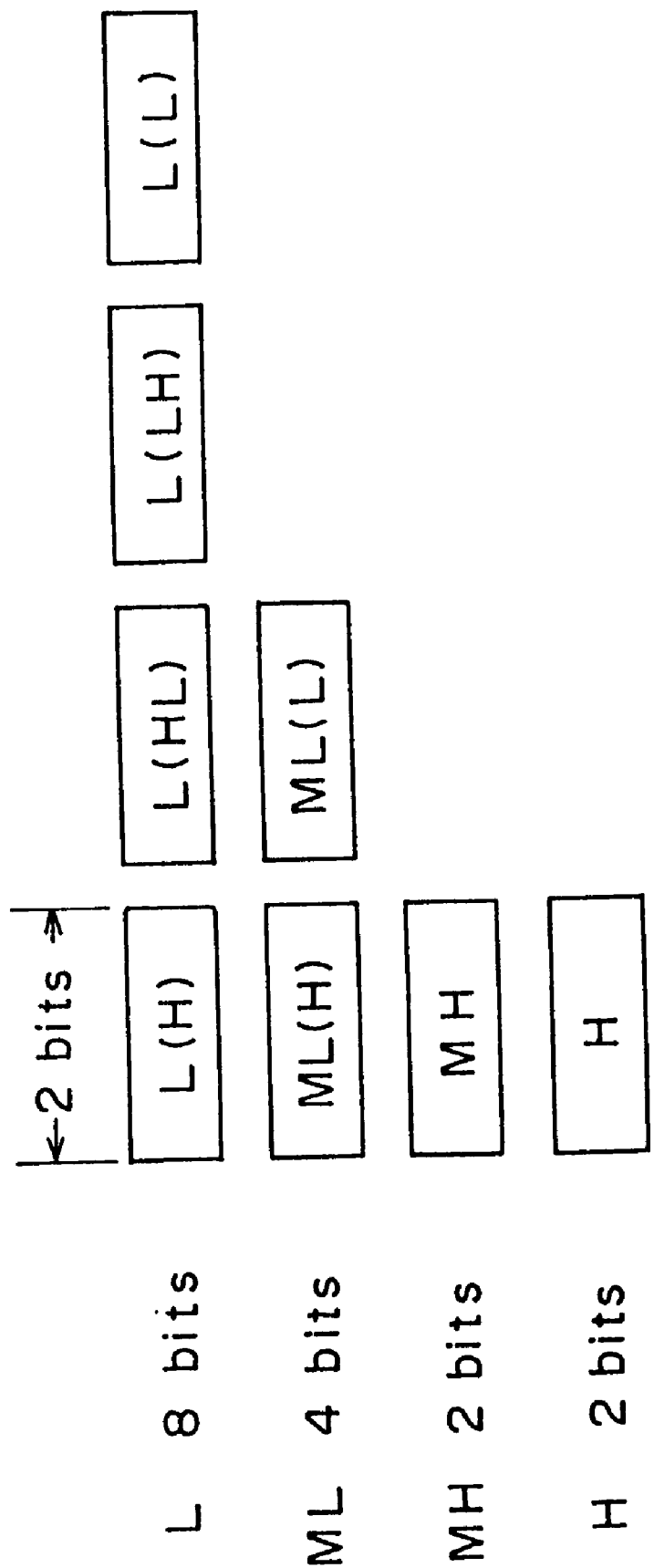
FIG. 4 is an illustration of a structure of a quantization code when cell priority order is considered.
Figure 5:
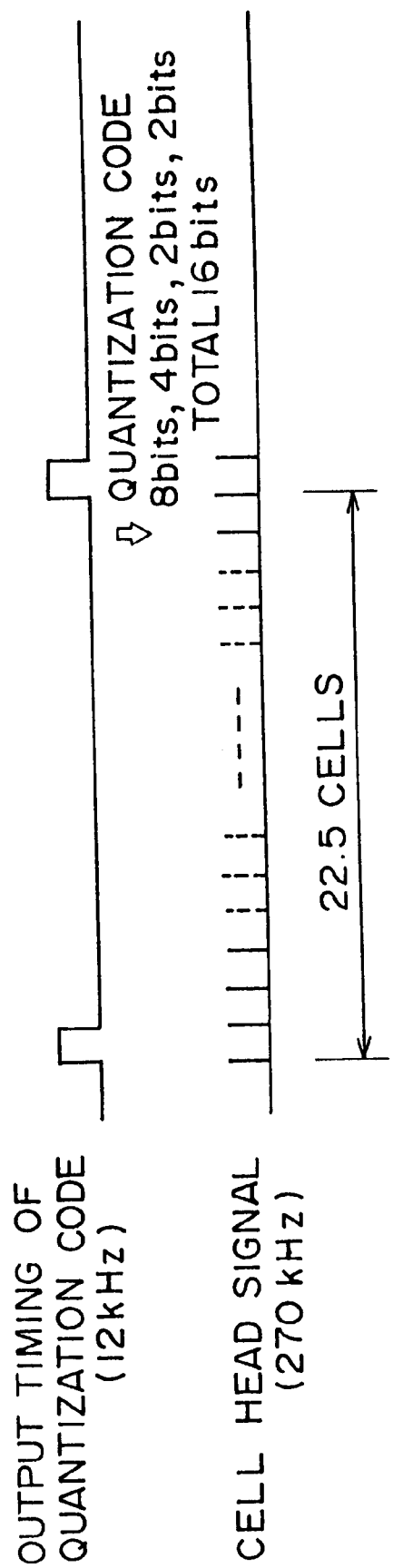
FIG. 5 is a diagram showing a relationship between output timing of a quantization code and a cell head signal.
Figure 7A:
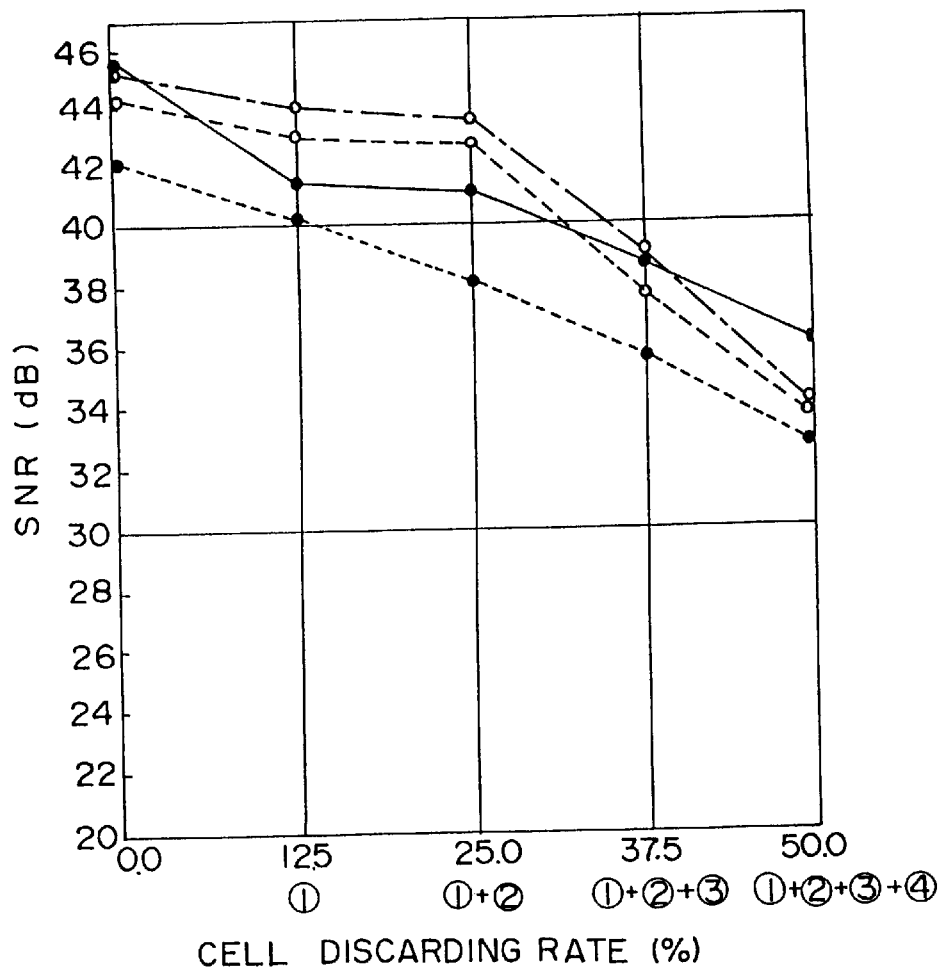
FIG. 7A is a graph showing a relationship between signal to noise ratio (SNR) and cell discard ratio.
Figure 7B:
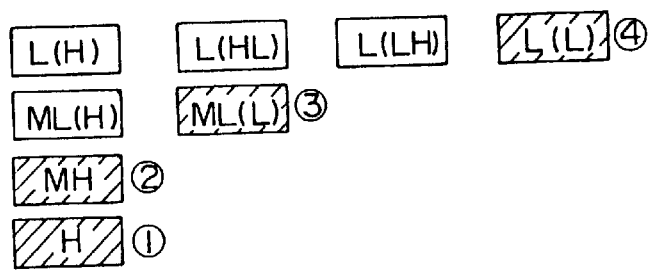
FIG. 7B is an illustration showing a discarding order of cells when the cell priority order control is applied.
Figure 8A:
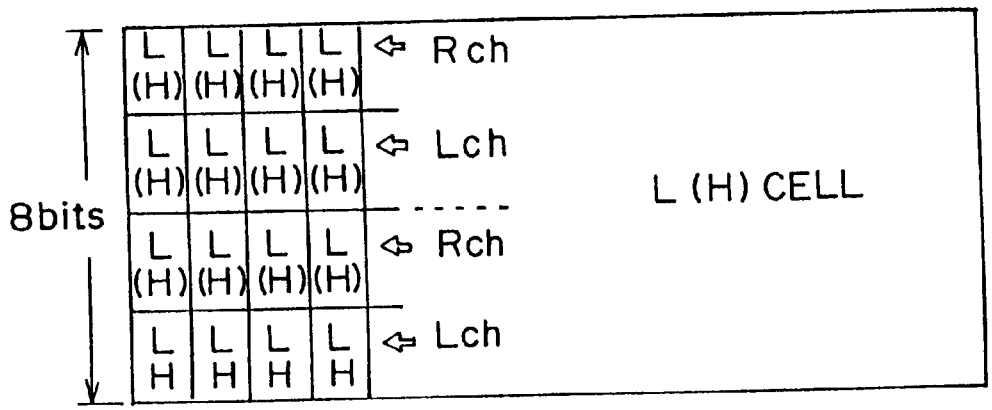
FIGS. 8A through 8H are illustrations showing constructions of cell data assembled in accordance with the cell priority order control.
Figure 8B:
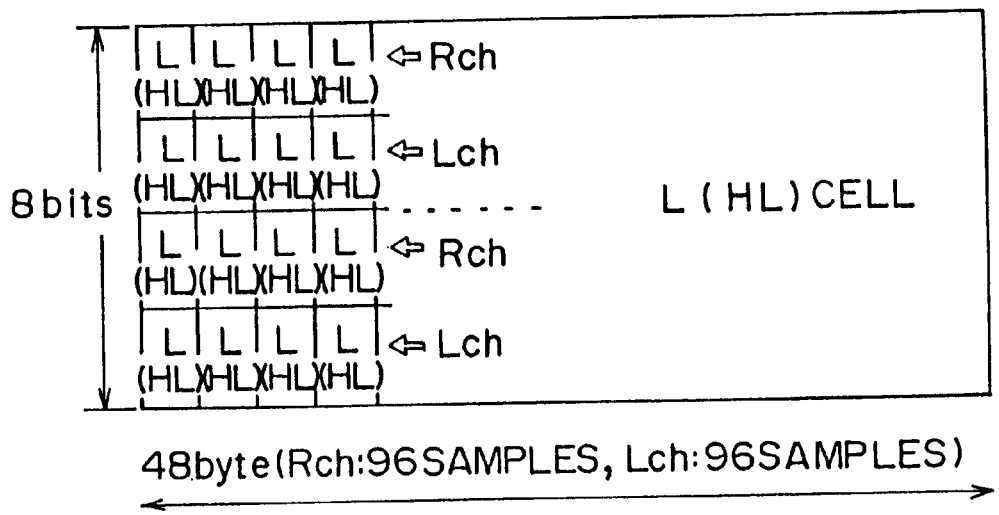
Figure 8C:
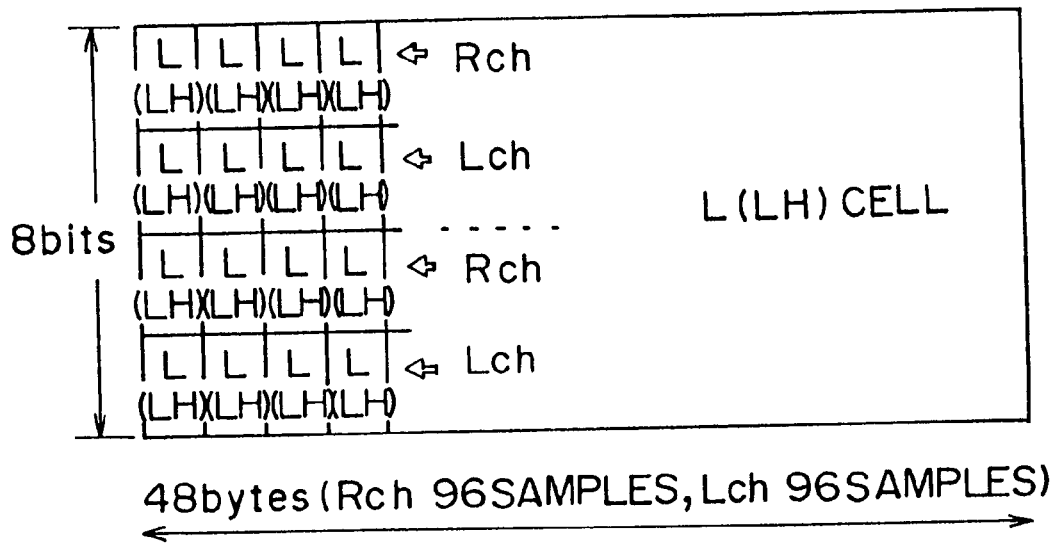
Figure 8D:
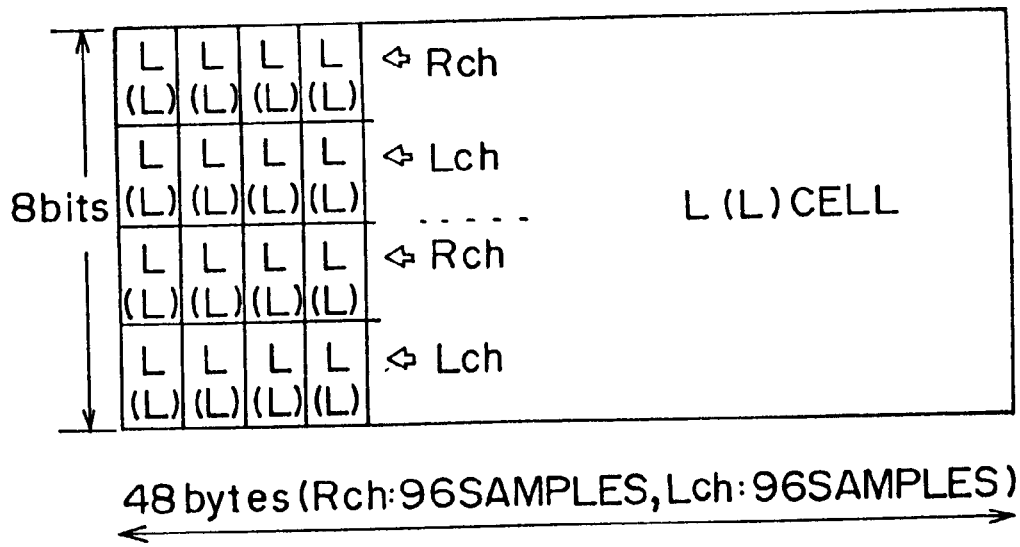
Figure 8E:
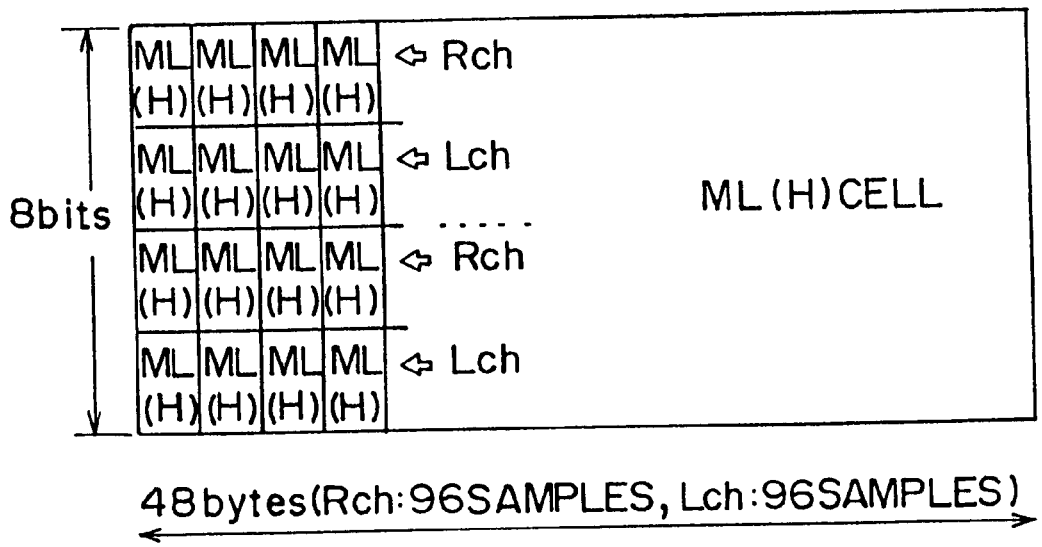
Figure 8F:
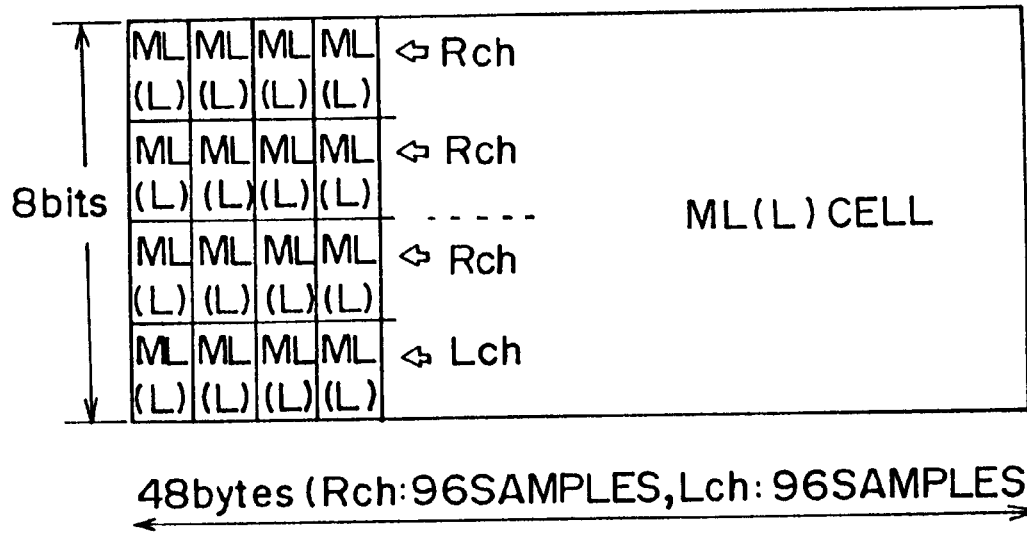
Figure 8G:
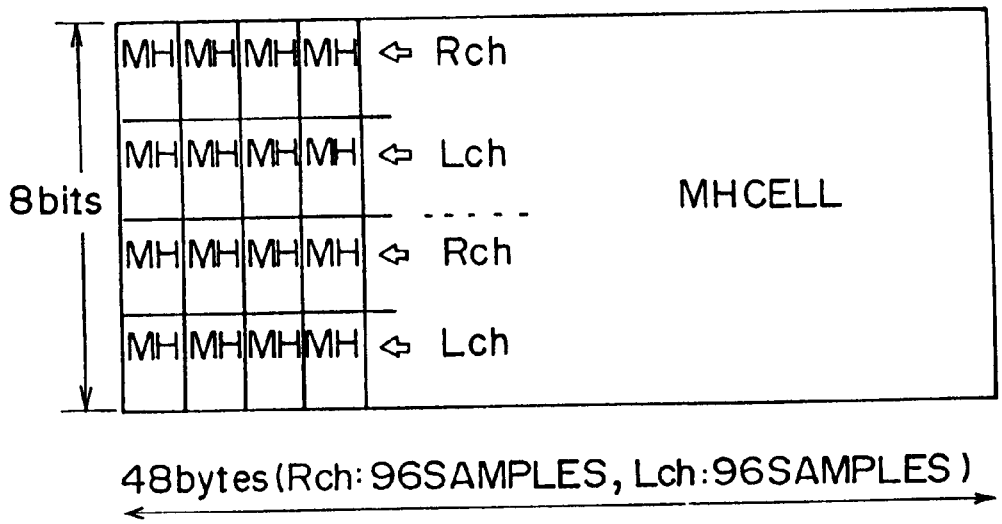
Figure 8H:
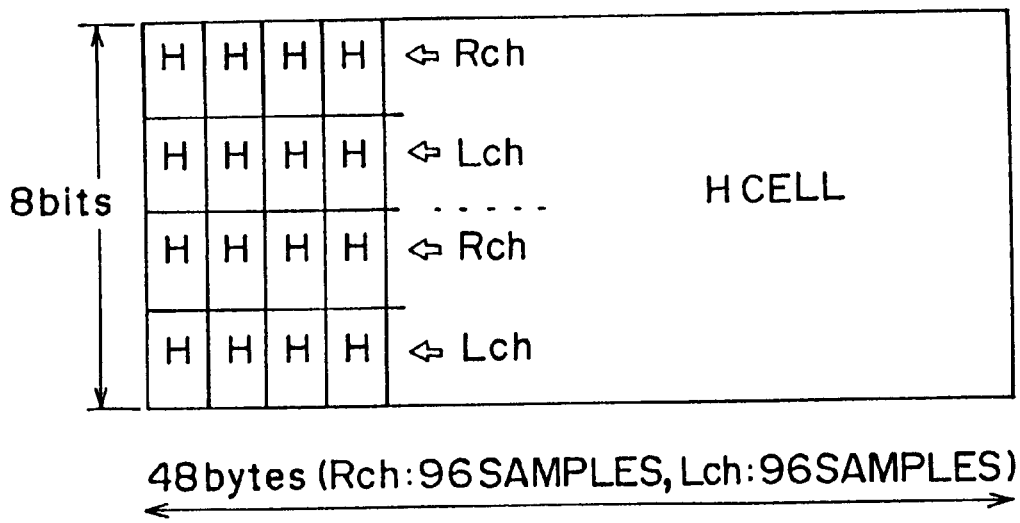

The terminal $23_1$ comprises a cell assembling unit $24_1$ which assembles a cell from code data supplied by an encoder, and a cell disassembling unit $25_1$ which disassembles a cell to code data and outputs the code data to a decoder. The cell assembled by the cell assembling unit $24_1$ is sent via the network controller $22_1$ to the ATM network. A cell received from the ATM network via the network controller $22_1$ is supplied to the cell disassembling unit $25_1$. Similar to the terminal $23_1$, the terminal $23_2$ comprises a cell assembling unit $24_2$ which assembles a cell from code data supplied by an encoder, and a cell disassembling unit $25_2$ which disassembles a cell to code data and outputs the code data to a decoder. In the above structure, the terminals $23_1$ and $23_2$ can mutually communicate via the ATM network 21. It should be noted that data which indicate whether the cell discarding mode is to be selected are included in the header cell data shown in FIG. 2.

When the network controller $22_1$, for example, determines that a cell discarding operation should be performed because the ATM network is busy, the network controller $22_1$ notifies the terminal $23_1$ that a mode (cell discarding mode) in which some cells are discarded is to be used. The terminal $23_1$ is accordingly set in the cell discarding mode. The terminal $23_1$ sends cells which are assembled in the cell assembling unit in the cell discarding mode via the controller $22_1$.

The network controller $22_1$ discards cells in accordance with the availability of the transmission path of the ATM network. The cells which are not discarded are transmitted through the ATM network 21 via the network controller $22_2$ to the terminal $23_2$. The cells are disassembled to code data by the cell disassembling unit $25_2$, and sent to the decoder. It should be noted that when some cells are discarded at the network controller $22_1$, frame of cell data to be transmitted is compacted. After the cell data are transmitted to the terminal $23_2$, dummy data are inserted into positions where the discarded data were present, and stored in a buffer memory. Assembling of the cell data stored in the buffer is disassembled after interpolating data corresponding to the dummy data.

It should be noted that the same procedure is used when data are sent from the terminal $23_2$ to the terminal $23_1$.

Figure 12:
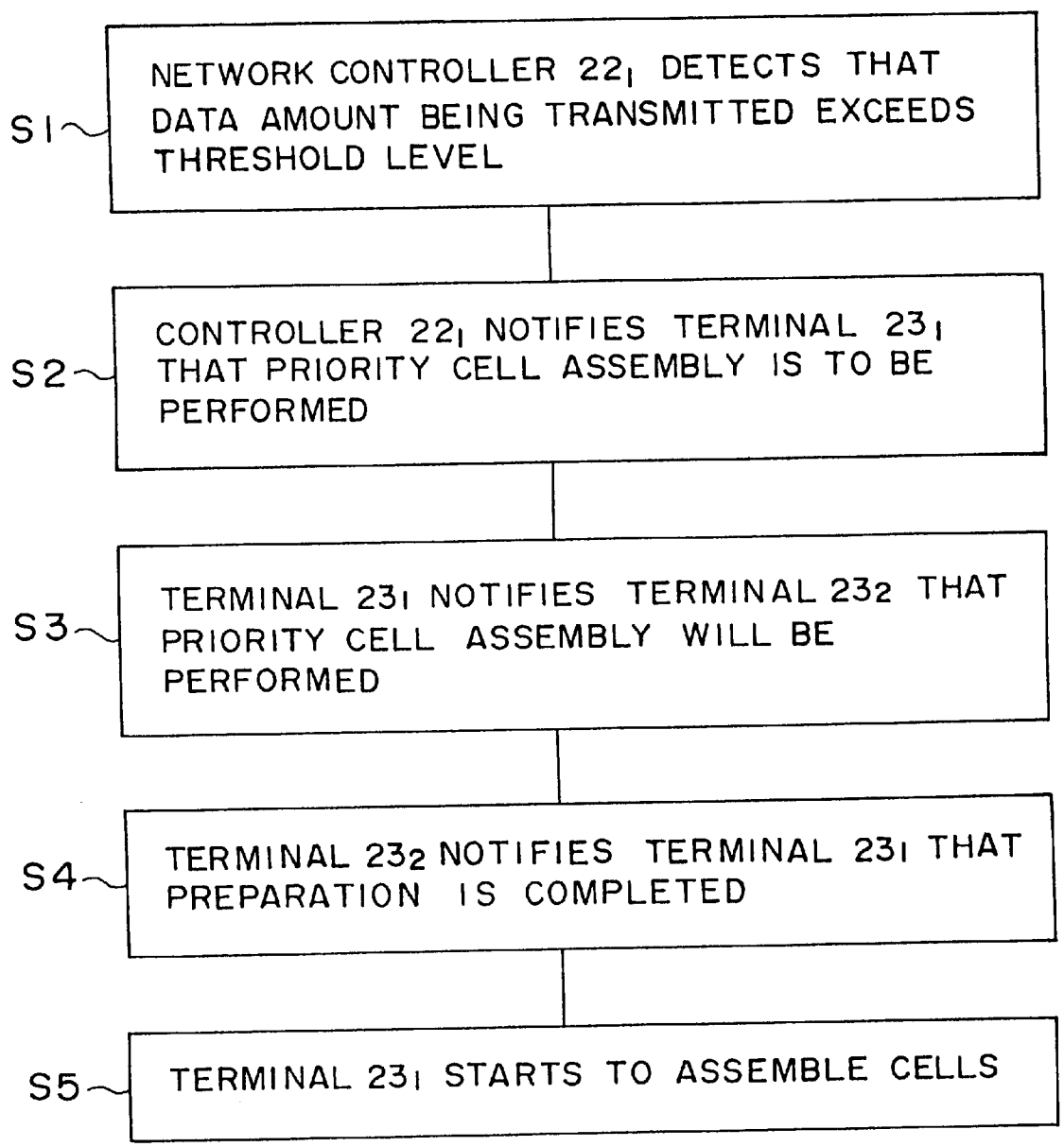
FIG. 12 is a flow chart of a switching operation from a regular cell assembling mode to a priority cell assembling mode.

FIG. 12 is a flow chart of a switching operation from a regular cell assembling mode to a priority cell assembling mode. The regular cell assembling mode is used when the cell discarding operation is not performed, while the priority cell assembling mode is used when the terminal is set to the cell discarding mode. The switching operation shown in FIG. 12 corresponds to a case where a transmission of a cell is performed from the terminal $23_1$ to the terminal $23_2$.

In step 1 (hereinafter "step" is abbreviated as "S"), it is determined by the network controller $22_1$ that the amount of data currently transmitted through the transmission path exceeds a predetermined threshold value, which condition represents that cells are to be discarded at the network controller $22_1$. In S2, the network controller $22_1$ notifies the terminal $23_1$ that the operation should be switched from the regular cell assembling mode to the priority cell assembling mode. In S3, the terminal $23_1$ notifies the terminal $23_2$ that the terminal $23_1$ performs a priority cell assembling operation. When the terminal $23_2$ is notified that the terminal $23_1$ performs the priority cell assembling operation, the terminal $23_2$ prepares for the reception of cells assembled by the priority cell assembling operation. That is, the operation of the terminal $23_2$ is switched from the regular cell assembling mode to the priority cell assembling mode. After the preparation is completed, the terminal $23_2$ notifies the terminal $23_1$ that the preparation for receiving cells assembled by the priority cell assembling operation is completed. The terminal $23_1$ then starts, in S5, to assemble the cells by the priority cell assembling operation.

Figure 13:
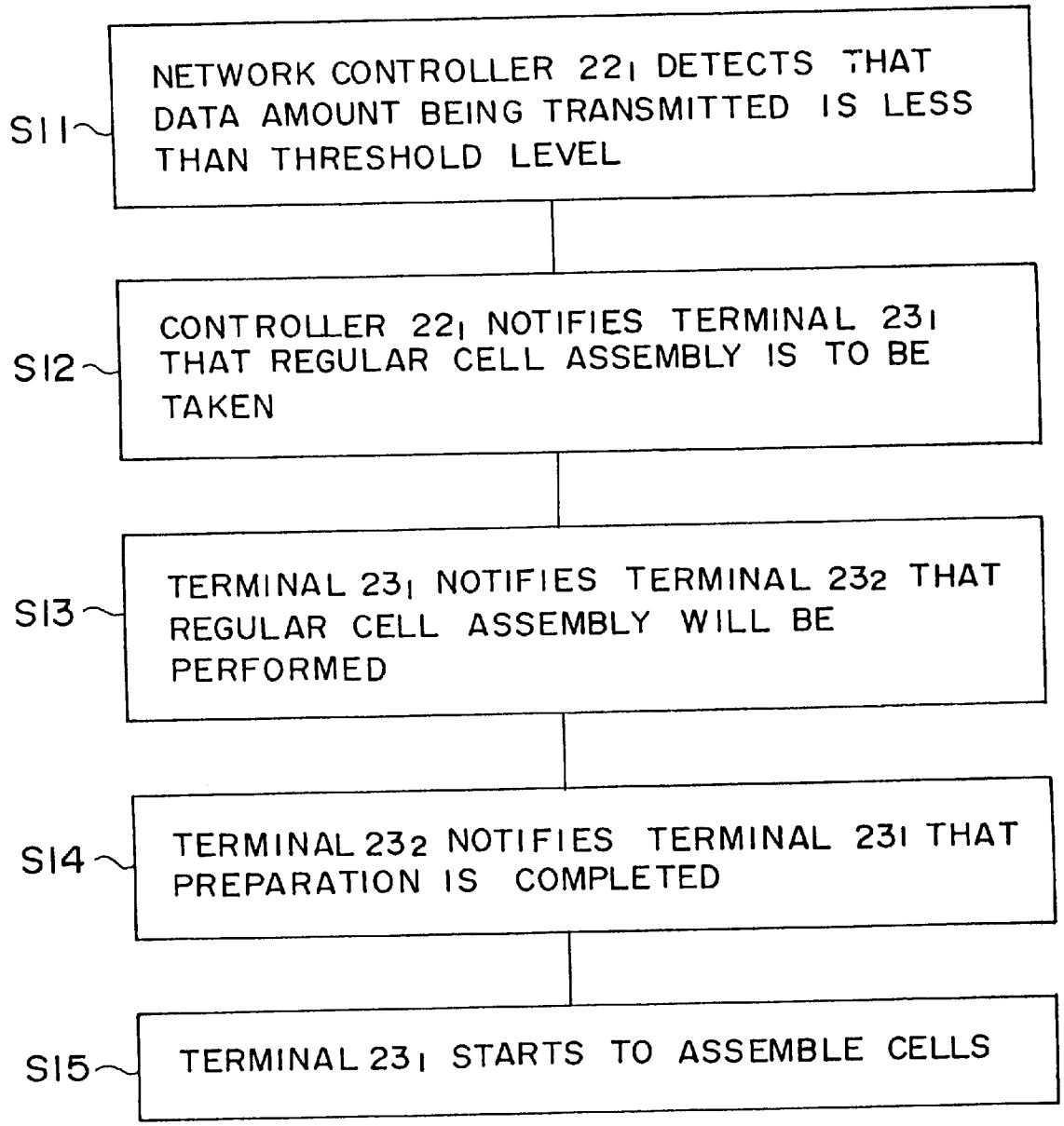
FIG. 13 is a flow chart of a switching operation to return from the priority cell assembling mode to the regular cell assembling mode.

FIG. 13 is a flow chart of a switching operation to return from the priority cell assembling mode to the regular cell assembling mode. The switching operation shown in FIG. 13 corresponds to a case where transmission of cells is performed from the terminal $23_1$ to the terminal $23_2$.

In step 11, it is determined by the network controller $22_1$ that the amount of data currently transmitted through the transmission path is less than a predetermined threshold value, which condition represents that cells do not need to be discarded at the network controller $22_1$. In S12, the network controller $22_1$ notifies the terminal $23_1$ that the operation should be switched from the priority cell assembling mode to the regular cell assembling mode. In S13, the terminal $23_1$ notifies the terminal $23_2$ that the terminal $23_1$ performs a regular cell assembling operation. When the terminal $23_2$ is notified that the terminal $23_1$ performs the regular cell assembling operation, the terminal $23_2$ prepares for the reception of cells assembled by the regular cell assembling operation. That is, the operation of the terminal $23_2$ is switched from the priority cell assembling mode to the regular cell assembling mode. After the preparation is completed, the terminal $23_2$ notifies the terminal $23_1$ that the preparation for receiving cells assembled by the regular cell assembling operation is completed. The terminal $23_1$ then starts, in S5, to assemble the cells by the regular cell assembling operation.

Figure 14:
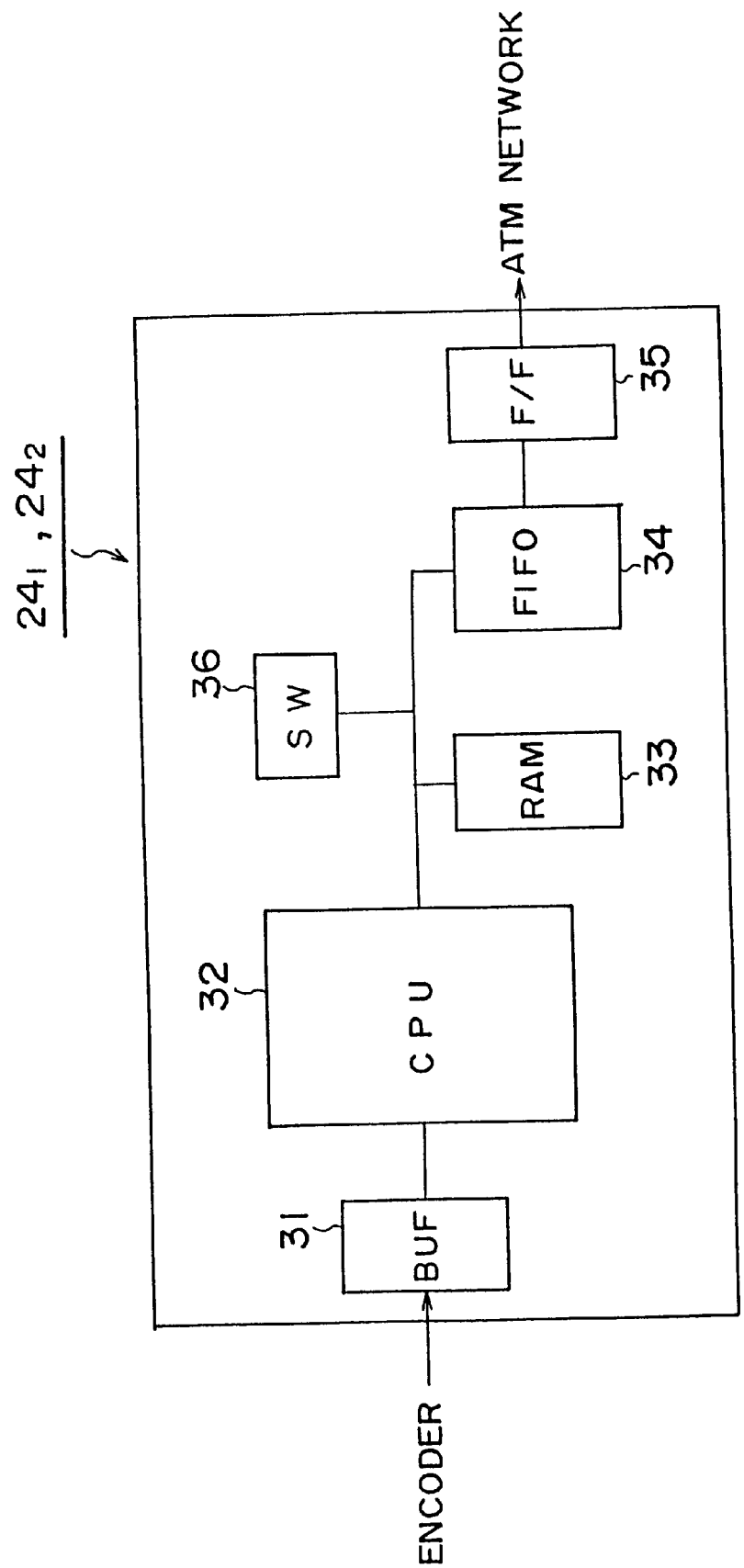
FIG. 14 is a block diagram of the cell assembling units shown in FIG. 11.

FIG. 14 is a block diagram of the cell assembling units shown in FIG. 11. As shown in FIG. 14, each of the cell assembling units $24_1$ and $24_2$ comprises a buffer (BUF) 31, a central processing unit (CPU) 32, a random access memory (RAM) 33, a first-in first-out memory (FIFO) 34, a flip-flop (F/F) 35 and a switching unit (SW) 36. The buffer 31 temporarily stores encoded data. The central processing unit 32 combines the left channel data and the right channel data and assembles a cell from the encoded data. The random access memory 34 is provided for storing the cell data produced by the central processing unit 32. The first-in first-out memory 34 temporarily stores the cell data to be transmitted. The flip-flop 35 adjusts the timing for outputting of the cell data to be transmitted. The switching unit adds header information, such as identification information of a terminal to which the cell data are to be sent, to the cell data.

The central processing unit 32 receives the encoded data supplied by the encoder via the buffer 31, and assembles a cell from the encoded data. The cell data are stored in the random access memory 33. When the cell data were assembled by means of the regular cell assembly, the cell data are sent to the first-in first-out memory 34 immediately after a single cell has been stored in the random access memory 33. The cell data stored in the first-in first-out memory 34 are transmitted to the ATM network via the flip-flop 35 at intervals of 1 ms, corresponding to 270 cell periods.

When the cell was assembled by means of the aforementioned priority cell assembling mode in which 2-bit code data are assembled into a cell, cell data is sent to the first-in first-out memory after data for 8 cells have been stored in the random access memory 33. The cell data stored in the first-in first-out memory 34 are transmitted to the ATM network via the flip-flop 35 at intervals of 1 ms, corresponding to 270 cell periods.

Figure 15:
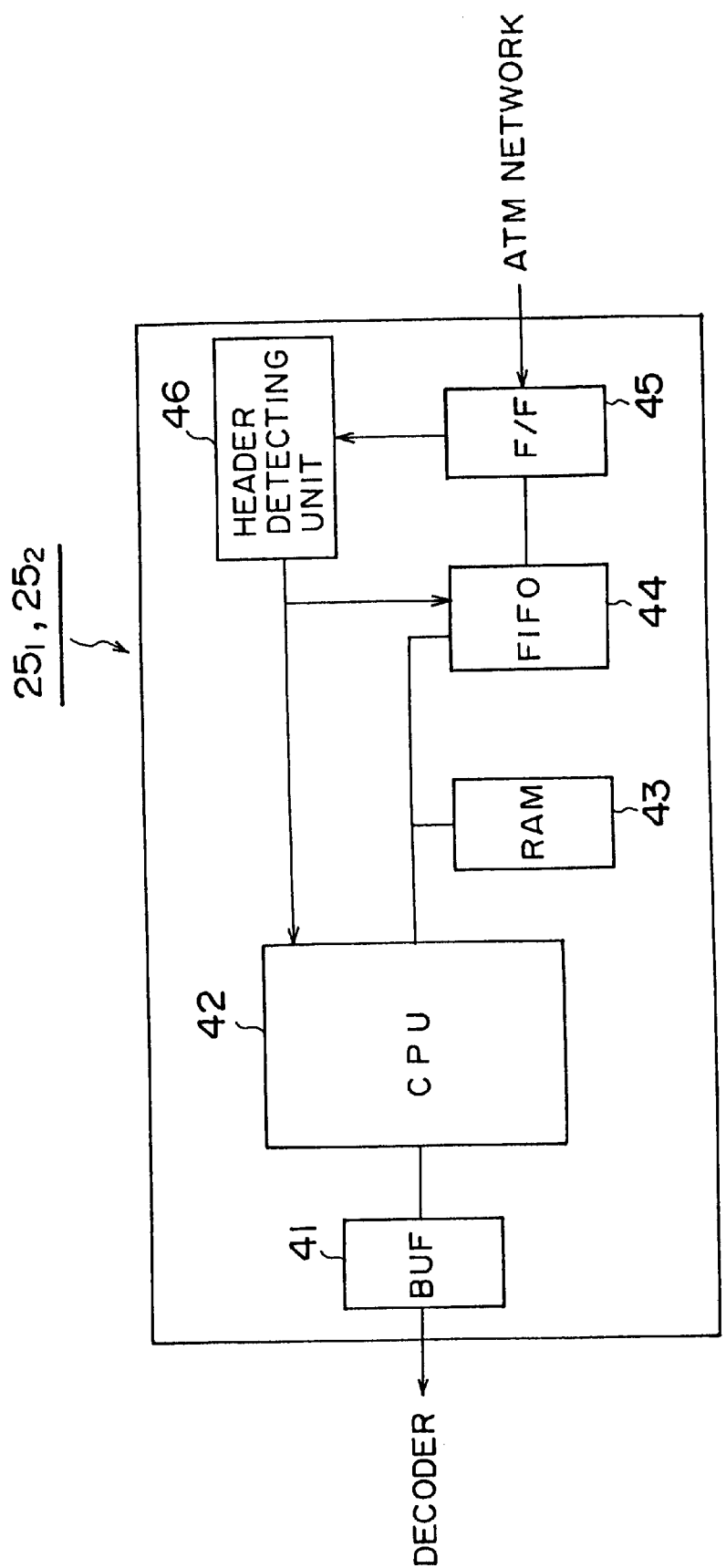
FIG. 15 is a block diagram of the cell disassembling units shown in FIG. 11.

FIG. 15 is a block diagram of the cell disassembling units shown in FIG. 11. As shown in FIG. 14, each of the cell disassembling units $25_1$ and $25_2$ comprises a buffer (BUF) 41, a central processing unit (CPU) 42, a random access memory (RAM) 43, a first-in first-out memory (FIFO) 44, a flip-flop (F/F) 45 and a header detecting unit 46. The buffer 41 temporarily stores the encoded data to be sent to the decoder. The central processing unit 42 separates the left cannel data and the right channel data and disassembles a cell into the encoded data. The random access memory 44 is provided for storing the cell data to be supplied to the central processing unit 42. The first-in first-out memory 44 temporarily stores the cell data received via the ATM network. The flip-flop 35 adjusts timing for receiving of the cell data transmitted through the ATM network. The header detecting unit 46 detects the header information attached to the cell data.

Cell data received from the ATM network via the flip flop 45 are stored to the first-in first-out memory 45 when the cell data are recognized to be addressed to the local terminal. The cell data stored in the first-in first-out memory are read one cell at a time by the central processing unit 42, and stored in the random access memory 43. When the cell data were assembled by means of the regular cell assembly, the cell data are disassembled and are sent to the buffer 41 immediately after a single cell has been stored in the random access memory 43. The cell data stored in the buffer 41 are then sent to the decoder.

When the cell was assembled by means of the aforementioned priority cell assembling mode in which 2-bit code data are used for assembling a cell, cell data are disassembled after cell data corresponding to 8 cells are stored in the random access memory 43.

Figures 16A, 16B:
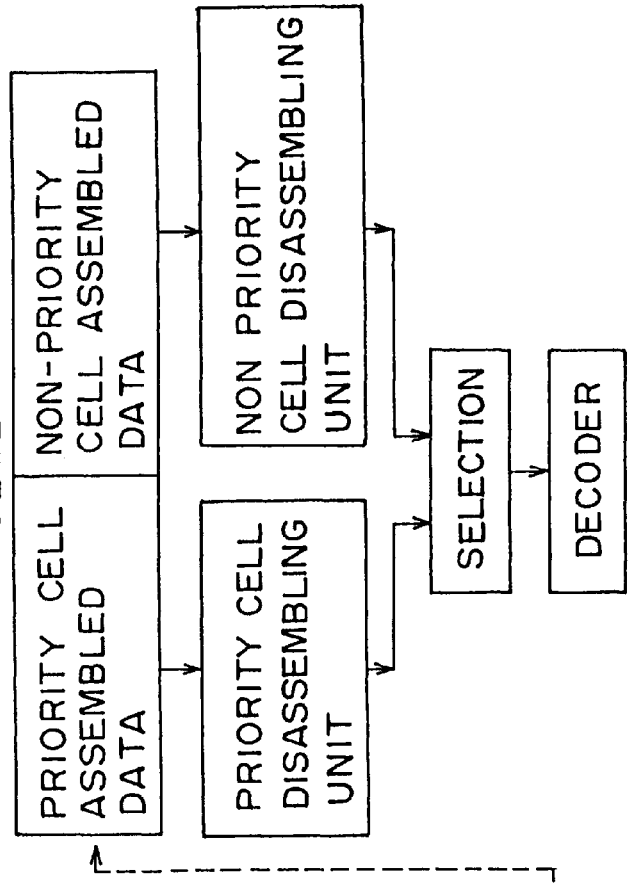
FIG. 16A is an illustration showing a cell assembling process performed in a second embodiment according to the present invention.
FIG. 16B is an illustration showing a cell disassembling process performed in the second embodiment.

A description will now be given, with reference to FIGS. 16A, 16B and 17, of a second embodiment of a cell assembling/disassembling system according to the present invention. FIG. 16A is an illustration showing a cell assembling process, and FIG. 16B is an illustration showing a cell disassembling process performed in the second embodiment.

In the present embodiment, the same code data are supplied from the encoder to both the priority cell assembling unit and the non-priority cell assembling unit. The code data supplied to the priority cell assembling unit are assembled, in accordance with the priority order of the cell as mentioned before, into the first half of a cell. The code data supplied to the non-priority cell assembling unit are assembled, in the regular manner, into the second half of the cell. Accordingly, a single cell comprises code data assembled by the priority cell assembling unit and, by the non-priority cell assembling unit.

When disassembling the above-mentioned cell, the code data assembled by the priority cell assembling unit are disassembled by the priority cell disassembling unit, and the code data assembled by the non-priority cell assembling unit are disassembled by the non-priority cell disassembling unit. The code data disassembled by either the priority cell disassembling unit or the non-priority cell disassembling unit are then selected and supplied to the decoder. As mentioned above, in the present embodiment, the cell is assembled in the priority cell assembling mode and regular assembling mode at the same time on the assembling side, and the disassembled data are selected on the disassembling side.

Figure 17:
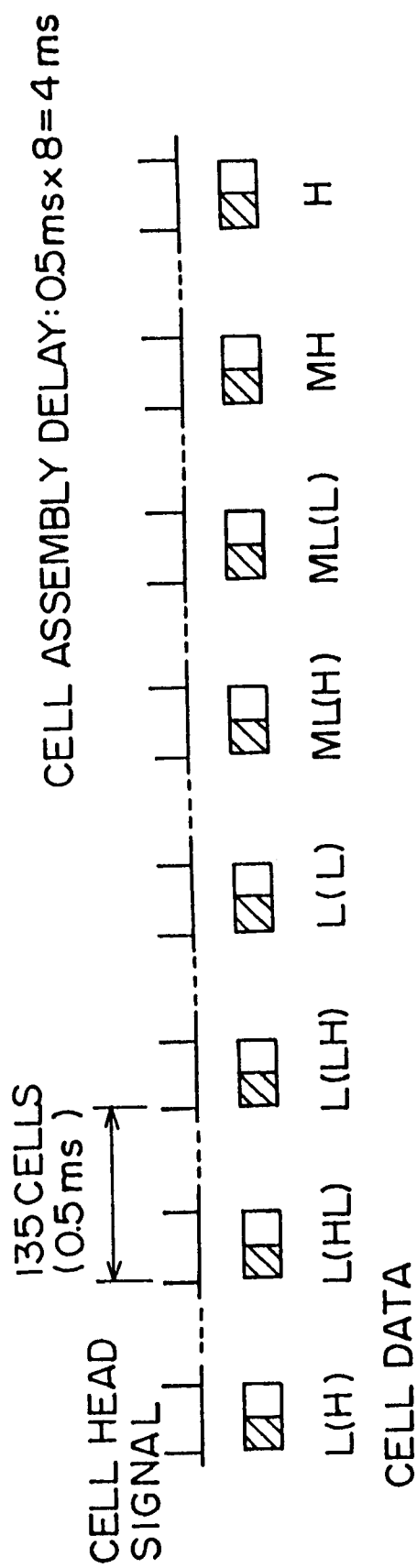
FIG. 17 is an illustration showing output timing of cells in the second embodiment.

FIG. 17 is an illustration showing output timing of cells in the second embodiment. The cells according to the present embodiment can be output every 0.5 ms, corresponding to 135 cell periods because the amount of data in a single cell is one half of that of the prior art shown in FIG. 9B. That is, the time delay in the present embodiment is 0.5 ms×8=4 ms. The time delay due to the assembling and disassembling of the cell is also one half of the time delay in the conventional system which is in a cell discarding mode.

Figure 18:
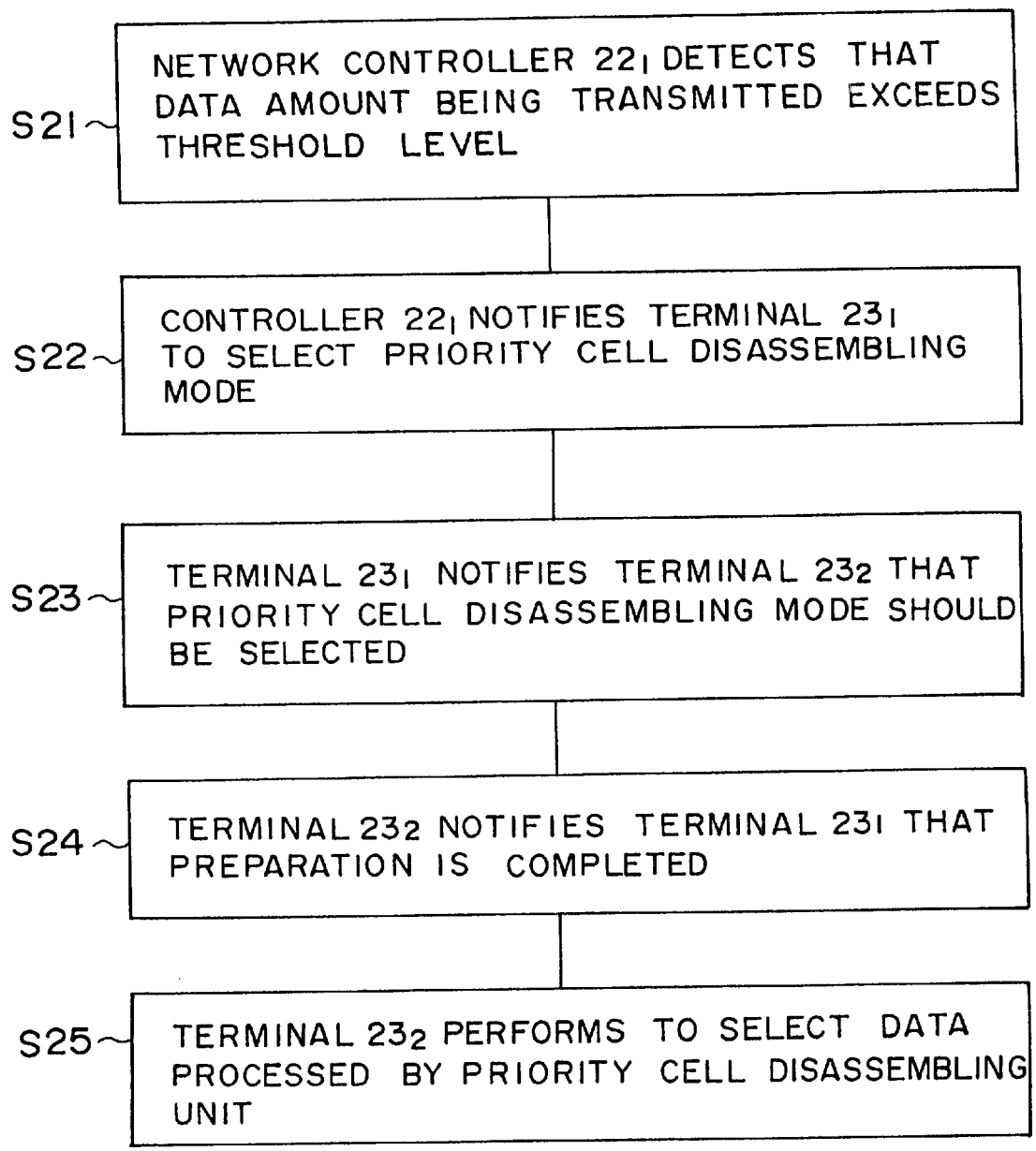
FIG. 18 is a flow chart of setting a cell disassembling unit to select a priority cell disassembling mode.

FIG. 18 is a flow chart of setting a cell disassembling unit to select a priority cell disassembling mode. The setting operation shown in FIG. 18 corresponds to a case where transmission of cells is performed from the terminal $23_1$ to the terminal $23_2$.

In step 21, it is determined by the network controller $22_1$ that the amount of data currently transmitted through the transmission path exceeds a predetermined threshold value, which condition represents that cells are to be discarded at the network controller $22_1$. In S22, the network controller $22_1$ notifies the terminal $23_1$ that the operation should be switched from the regular (non-priority) cell disassembling mode to the priority cell disassembling mode. In S23, the terminal $23_1$ notifies the terminal $23_2$ that the terminal $23_2$ should be set to perform a priority cell disassembling operation. The terminal $23_2$ is then set to perform the priority cell disassembling operation. That is, the operation of the terminal $23_2$ is switched to select the data from the priority cell disassembling unit. After the preparation is completed, the terminal $23_2$ notifies the terminal $23_1$ that the preparation is completed. The terminal $23_1$ then proceeds, in S25, to select the data processed by the priority cell disassembling unit.

It should be noted that the setting operation from priority cell disassembling mode to the regular cell disassembling mode is performed in the similar manner to the above mentioned setting operation.

The present invention is not limited to the specifically disclosed embodiment, and variations and modifications may be made without departing from the scope of the present invention.

What is claimed is:

1. A cell assembling/disassembling system used for an ATM network system having a cell priority discard control function and including at least one cell assembling device and at least one cell disassembling device, a cell being transmitted from said cell assembling device to said cell disassembling device via an ATM network, said cell assembling device assembling a cell using signals inputted thereto from an encoder, all cells assembled by said cell assembling device being transferred to said cell disassembling device when an amount of data currently being transmitted through said ATM network is less than a predetermined amount, some cells being discarded when an amount of data currently being transmitted through said ATM network is more than said predetermined amount, said cell assembling/ disassembling system comprising:

first means for setting said cell assembling device, when the amount of data currently being transmitted is more than said predetermined amount, to a first assembling mode in which each of cells assembled by said cell assembling device has a discarding priority order;

second means for setting said cell disassembling device, when said cell assembling device performs a cell assembling operation using said first assembling mode, to a first disassembling mode in which cells having said discarding priority order are disassembled;

third means for setting said cell assembling device, when the amount of data currently being transmitted through said ATM network is less than said predetermined amount, to a second assembling mode in which a regular cell assembling operation in which no discarding priority order is provided to cells is performed; and fourth means for setting said cell disassembling device, when said cell assembling device performs a cell assembling operation using said second assembling mode, to a second disassembling mode in which cells having no discarding priority order are disassembled.

2. The cell assembling/disassembling system as claimed in claim 1, wherein said first means comprises means for notifying said cell disassembling device that cells are being assembled in said first assembling mode.

3. The cell assembling/disassembling system as claimed in claim 2, wherein said second means comprises means for notifying said cell assembling device that said cell disassembling device has been set in said first disassembling mode.

4. The cell assembling/disassembling system as claimed in claim 1, wherein said third means comprises means for notifying said cell disassembling device that cells are being assembled in said second assembling mode.

5. The cell assembling/disassembling system as claimed in claim 4, wherein said fourth means comprises means for notifying said cell assembling device that said cell disassembling device has been set in said second disassembling mode.

6. A cell assembling device used for an ATM network system having a cell priority discard control function, a cell being transmitted through an ATM network, said cell assembling device comprising:

first means for assembling a cell to be transmitted through said ATM network by using signals inputted to the cell assembling device from an encoder, said cell being assembled using one of a first method in which said cell is provided with a discarding priority order and a second method in which said cell has no discarding priority order; and second means for selecting one of said first and said second method performed in said first means, said cell being assembled using said first method when an amount of data currently being transmitted through the ATM network is more than a predetermined amount, and said cell being assembled using said second method when the amount of data currently being transmitted through the ATM network is less than said predetermined amount.

7. A cell assembling device used for an ATM network system having a cell priority discard control function, a cell being transmitted through an ATM network, said cell assembling device comprising:

first means for assembling said cell in accordance with a cell priority assembling mode;

second means for assembling said cell in accordance with a regular assembling mode in which said cell has no discarding priority order; and third means for controlling said first means and said second means so that said cell is assembled using said first means when an amount of data currently being transmitted through said ATM network is more than a predetermined amount, said cell having a discarding priority order, and said cell is assembled using said second means when the amount of data currently being transmitted through the ATM network is less than said predetermined amount, said cell having no discarding priority order.

8. A cell disassembling device used for an ATM network system having a cell priority discard control function, a cell being transmitted through an ATM network, said cell disassembling device comprising:

first means for disassembling said cell received via said ATM network by one of a first method and a second method; and second means for selecting one of said first method and said second method performed in said first means, said cell being disassembled using said first method when an amount of data currently being transmitted through said ATM network is more than a predetermined amount, said cell having a disca priority order, said cell being disassembled using said second method when the amount of data currently being transmitted through said ATM network is less than said predetermined amount, said cell having n discarding priority order.

9. A cell disassembling device used for an ATM network system having a cell priority discard control function, a cell being transmitted through an ATM network, said cell disassembling device comprising:

first means for disassembling said cell in accordance with a cell priority disassembling mode;

second means for disassembling said cell in accordance with a regular disassembling mode; and third means for controlling said first means and said second means so that said cell is disassembled using said first means when an amount of data currently being transmitted through said ATM network is more than a predetermined amount, said cell having a discarding priority order, and said cell is disassembled using said second means when the amount of data currently being transmitted through said ATM network is less than said predetermined amount, said cell having no discarding priority order.

10. A cell assembling/disassembling system used for an ATM network system having a cell priority discard control function, at least one cell assembling device and at least one cell disassembling device being provided in said ATM network system, a cell being transmitted from said cell assembling device to said cell disassembling device via an ATM network, said cell assembling device assembling a cell using signals inputted thereto from an encoder, all cells assembled by said cell assembling device being transferred to said cell disassembling device when an amount of data currently being transmitted through said ATM network is less than a predetermined amount, some cells being discarded when the amount of data currently being transmitted through said ATM network is more than said predetermined amount, said cell assembling/disassembling system comprising:

first means, provided in said cell assembling device, for assembling a cell having a first area and a second area, said first area being provided with first data assembled by a first assembling method so that said first area has a discarding priority order, said second area being provided with second data assembled by a second assembling method so that said second area has no discarding priority order;

second means, provided in said cell disassembling device, for receiving said cell from said ATM network and disassembling said cell, said second means selecting one of said first data and said second data to be output from said cell disassembling device;

third means for setting said second means so that said second means selects and outputs said first data disassembled by said second means when an amount of data currently being transmitted through said ATM network is more than said predetermined amount, and said second means selects and outputs said second data disassembled by said second means when the amount of data currently being transmitted through said ATM network is less than said predetermined amount.

11. The cell assembling/disassembling system as claimed in claim 10, wherein said first means comprises means for notifying said third means that said first data is to be selected by said second means.

12. The cell assembling/disassembling system as claimed in claim 11, wherein said second means comprises means for notifying said first means that said second means has been set to select either said first data or said second data.

13. The cell assembling/disassembling system as claimed in claim 11, wherein said first means comprises means for notifying said third means that said second data is to be selected by said second means.

14. The cell assembling/disassembling system as claimed in claim 13, wherein said second means comprises means for notifying said first means that said second means has been set to select said second data.

15. A cell assembling device used for an ATM network system having a cell priority discard control function, a cell having a fixed length and having a header and a data part, the data part having a first portion and a second portion, the cell being transmitted through an ATM network, said cell assembling device comprising:

first means for assembling said first portion of said cell in accordance with a cell priority assembling mode so that said cell has a discarding priority order; and second means for assembling said second portion of said cell in accordance with a regular assembling mode, wherein when the cell is disassembled, one of said first portion and said second portion is selected based on a level of congestion of the ATM network.

16. A cell assembling device as claimed in claim 15, wherein said first portion contains half of an amount of data of a single cell.

17. A cell assembling device as claimed in claim 15, wherein said second portion contains half of an amount of a single cell.

18. A cell disassembling device used for an ATM network system having a cell priority discard control function, a cell having a fixed length and having a header and a data part, the data part having a first portion and a second portion, the cell being transmitted through an ATM network, said cell disassembling device comprising:

first means for disassembling said first portion of said cell in accordance with a cell priority assembling mode, and outputting first data;

second means for disassembling said second portion of said cell in accordance with a regular assembling mode, and outputting second data; and third means for selecting said first data when an amount of data currently being transmitted through said ATM network is more than a predetermined amount, and selecting said second data when the amount of data currently being transmitted through said ATM network is less than said predetermined amount.

* * * * *